J. CARSE.
FREE WHEEL MECHANISM FOR CYCLES AND THE LIKE.
APPLICATION FILED FEB. 28, 1918.
1,313,067.
Patented Aug. 12, 1919.
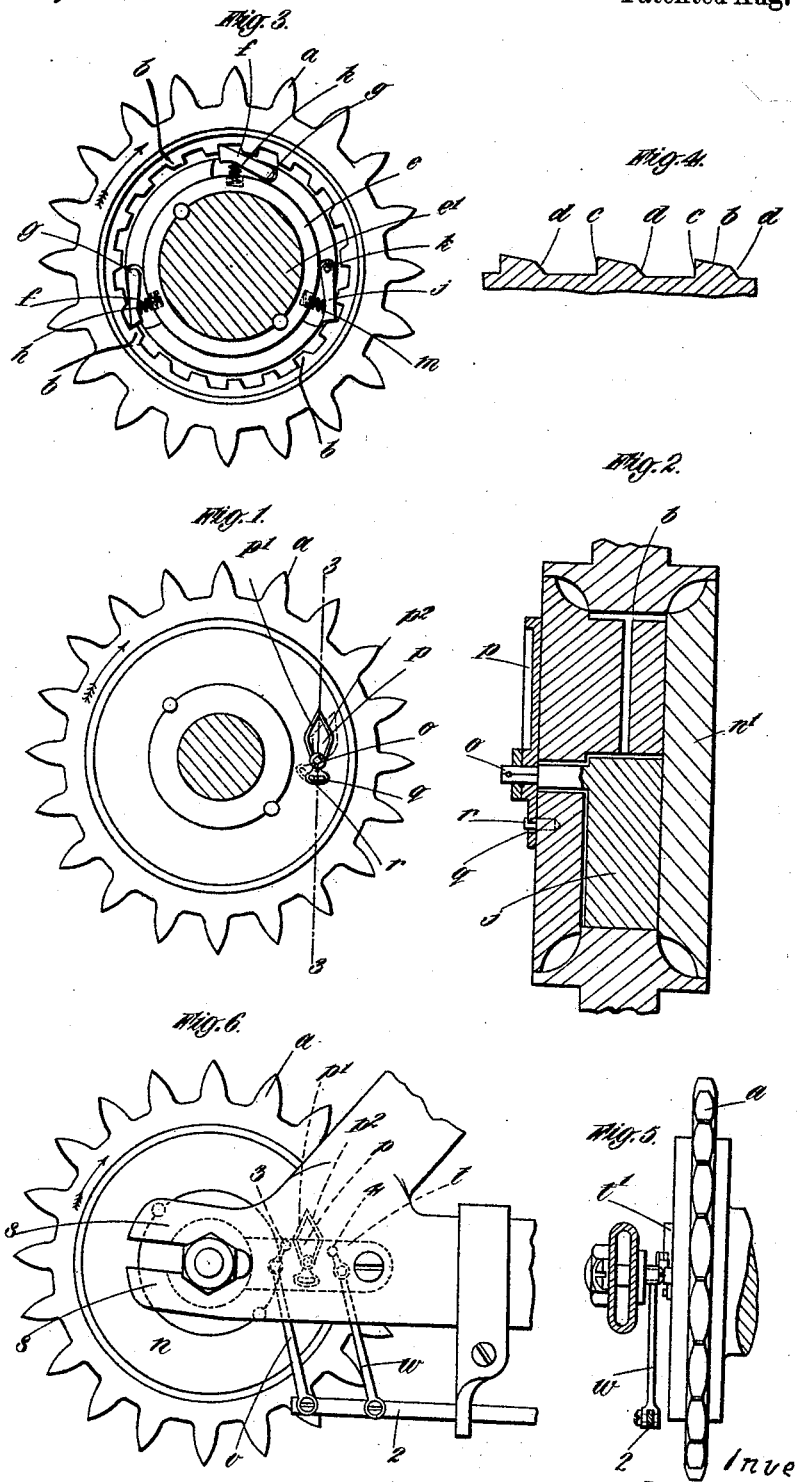
Inventor
James Carse
By Wm Wallace White
Attorney

UNITED STATES PATENT OFFICE.

JAMES CARSE, OF BEDLINGTON, ENGLAND.

FREE-WHEEL MECHANISM FOR CYCLES AND THE LIKE.

1,313,067.  Specification of Letters Patent. Patented Aug. 12, 1919.

Application filed February 28, 1918. Serial No. 219,688.

*To all whom it may concern:*

Be it known that I, JAMES CARSE, a subject of the King of Great Britain, of 2 Walker Terrace, East End, Bedlington, Northumberland, England, have invented certain new and useful Improvements in or Relating to Free-Wheel Mechanism for Cycles and the like, of which the following is a specification.

This invention relates to free wheel mechanism, that is mechanism adapted to permit relative movement between the driving and driven members in one direction but not in the other, of the type in which the mechanism can be locked to prevent such relative movement.

The object of this invention is to provide an improved free wheel mechanism of this type.

Referring to the drawings filed herewith:—

Figure 1 is an exterior elevation of one form of free wheel mechanism made in accordance with this invention as applied to the back wheel of a bicycle.

Fig. 2 is a view taken on the line 3—3 of Fig. 1.

Fig. 3 is a sectional view taken through the axle and showing the mechanism in side elevation.

Fig. 4 is a part enlarged section showing the shape of the teeth.

Fig. 5 is a section through the frame showing a side view of the sprocket wheel.

Fig. 6 is a side elevation.

$a$ is a sprocket ring provided with internal teeth $b$. Each tooth has a square abutment face $c$ and an inclined abutment face $d$. Within the sprocket wheel is a sleeve $e$ carrying pawls $f$ $f$ pivoted at $g$ $g$ adapted to engage the square abutment faces $c$ $c$ of the teeth $b$ in the sprocket ring $a$. The sleeve $e$ is keyed to the axle $e'$. These pawls are pressed against the teeth by springs $h$ and are adapted to drive the shaft when the sprocket ring is rotated in the direction indicated by the arrow in Fig. 1. On the sleeve $e$ is mounted a pawl $j$ which is provided with a pivotal pin $k$. The pawl $j$ is adapted to bear against the inclined abutment faces $d$ $d$ of the teeth $b$. The pawl $j$ is adapted to prevent relative movement between the shaft $e'$ and the sprocket wheel when it is bearing against one of the inclined abutment faces $d$ $d$ and is hereafter referred to as the locking pawl. $n'$ is an annular cover plate provided with an internal screw thread adapted to engage an external screw thread on the base of the sleeve $e$. $n$ is the exterior or the outside part of the boss of the sleeve $e$. The pivotal pin $k$ on which the pawl $j$ turns passes through the boss of the sleeve $e$. The pin $k$ is fixed to the pawl and is provided with a squared end $o$. On the squared end is mounted a diamond shaped plate $p$ provided with flanges $p'$ $p^2$ and a slot $q$. A set screw $r$ passing through the slot $q$ into the exterior boss $n$ of the sleeve $e$ is adapted to be tightened so that it restricts the movement of the plate $p$ and pawl $j$, the spring $m$ being too weak to overcome the friction to turn the pawl to engage with the face $d$ of the teeth, but strong enough to keep the pawl from being jolted out of engagement therewith. By imparting angular movement to the diamond plate $p$ the pawl $j$ is moved to engage or disengage the inclined abutment face $d$.

Between the sprocket wheel ring $a$ and the back stay $s$ of the bicycle is a plate $t$ mounted on the spindle of the bicycle wheel. Pivotally mounted on the plate $t$ are two cranked levers $v$ $w$ connected to and adapted to be operated by a rod 2. The lever $v$ has an arm or tappet 3 adapted to be engaged by the flange $p'$ on the diamond shaped plate $p$ and the lever $w$ has an arm or tappet 4 adapted to be engaged by the flange $p^2$. The arrangement being such that when the rod 2 is pushed to one extreme position the diamond shaped plate $p$ striking one of the arms 3 or 4 moves the pawl $j$ into or out of engagement with the inclined abutment face $d$ and this determines whether relative movement between the driving and driven parts are permitted or restrained. The position of the arms 3 and 4 of the levers $v$ and $w$ are such that one is always clear of the plate $p$ while the other is just touched by the flange on the plate $p$ as the axle $e'$ revolves. The rod 2 is adapted to be moved by a Bowden wire mechanism or other suitable means.

If desired a pin or pins may be passed through holes in both the sprocket ring and the sleeve on the hub to lock the same together when it is intended that the wheel shall be used as a "fixed" for a considerable time.

What I claim and desire to secure by Letters Patent is:—

1. The improved free wheel mechanism comprising a driving member, internal teeth on the driving member having square abutment faces and inclined abutment faces, a driven member disposed within the driving member, spring pressed pawls on the driven member adapted to engage the square abutment faces on the said teeth, a locking pawl on the driven member, adapted to engage one of the inclined abutment faces on the said teeth and means for moving the said locking pawl into and out of engagement with said teeth.

2. The improved free wheel mechanism comprising a driving member, internal teeth on the driving member having square abutment faces and inclined abutment faces, a driven member disposed within the driving member, spring pressed pawls on the driven member adapted to engage the square abutment faces on the said teeth, a locking pawl on the driven member adapted to engage one of the inclined abutment faces on the said teeth and means for moving the said locking pawl into and out of engagement with said teeth, said means comprising a diamond shaped plate adapted to engage tappets with means for moving the tappets so as to be struck by the said diamond shaped plate to move the said plate from one position to another.

3. A wheel mechanism as embodied in claim 1, and means for preventing the locking pawl from being jolted out of engagement with the inclined abutment faces.

4. A wheel mechanism as embodied in claim 1, said means comprising a movable member connected to the locking pawl and rotatable with the driven member, and manually operable means capable of occupying two extreme positions and adapted when in either extreme position to engage the movable member during its rotation to move said member and, consequently, said locking pawl into and out of engagement with the inclined abutment faces, according as the member occupies one extreme position or the other.

In testimony whereof I have signed my name to this specification.

JAMES CARSE.

Witnesses:
A. CAMERON,
W. COLLINS.

Copies of this patent may be obtained for five cents each, by addressing the "Commissioner of Patents, Washington, D. C."